United States Patent
Guattari et al.

(10) Patent No.: US 9,518,826 B2
(45) Date of Patent: Dec. 13, 2016

(54) INTERFEROMETRIC MEASUREMENT SYSTEM WITH OPTICAL FIBRE AND INERTIAL GUIDANCE OR NAVIGATION SYSTEM INCLUDING SUCH AN INTERFEROMETRIC MEASUREMENT SYSTEM

(71) Applicants: Frederic Guattari, Aubervilliers (FR); Cedric Molucon, Paris (FR); Eric Ducloux, Rueil Malmaison (FR)

(72) Inventors: Frederic Guattari, Aubervilliers (FR); Cedric Molucon, Paris (FR); Eric Ducloux, Rueil Malmaison (FR)

(73) Assignee: IXBLUE, Saint-Germain-en-Laye (FR)

( * ) Notice: Subject to any disclaimer, the term of this patent is extended or adjusted under 35 U.S.C. 154(b) by 104 days.

(21) Appl. No.: 14/400,852

(22) PCT Filed: May 15, 2013

(86) PCT No.: PCT/FR2013/051060
§ 371 (c)(1),
(2) Date: Nov. 13, 2014

(87) PCT Pub. No.: WO2013/171428
PCT Pub. Date: Nov. 21, 2013

(65) Prior Publication Data
US 2015/0131102 A1 May 14, 2015

(30) Foreign Application Priority Data
May 16, 2012 (FR) ...................................... 12 54523

(51) Int. Cl.
*G01C 19/64* (2006.01)
*G01C 19/72* (2006.01)

(52) U.S. Cl.
CPC .................................. *G01C 19/721* (2013.01)

(58) Field of Classification Search
CPC .......... G01C 19/00; G01C 19/64; G01C 19/72; G01C 19/725
(Continued)

(56) References Cited

U.S. PATENT DOCUMENTS 5,157,461 A  10/1992 Page
5,260,768 A * 11/1993 Cordova .............. G01C 19/728
                                              356/460

(Continued)

OTHER PUBLICATIONS

International Search Report, dated Aug. 23, 2013, from corresponding PCT application.

*Primary Examiner* — Jonathan Hansen
(74) *Attorney, Agent, or Firm* — Young & Thompson (57) ABSTRACT

A fiber optic interferometric measurement system includes a light source; first and second optical transmission elements; first and second Sagnac-ring interferometers, respectively, including first and second fiber optic coils, and, respectively, having lengths $L_1$ and $L_2$; and first and second individual integrated optical circuits, respectively, connected to the first and second optical transmission elements, and to the two ends of the first and second optic coils, respectively. The interferometric system includes a multiple integrated optical circuit integrating, on a single substrate, the first and second individual integrated optical circuits, and the difference $\Delta l$ between the optical length of the first optical transmission elements and the optical length of the second optical transmission elements is higher than the maximum of $\Delta Nb_1 \times L_1$ and $\Delta NB_2 \times L_2$, in which $\Delta Nb_1$ and $\Delta Nb_2$, respectively, are the group birefringence index difference of the first and second fiber optic coils, respectively.

20 Claims, 4 Drawing Sheets

(58) Field of Classification Search
USPC .................................... 356/460, 466, 468
See application file for complete search history.

(56) References Cited

U.S. PATENT DOCUMENTS

| | | |
|---|---|---|
| 5,321,779 A | 6/1994 | Kissa |
| 5,854,678 A | 12/1998 | Liu et al. |
| 6,163,632 A | 12/2000 | Rickman et al. |
| 2009/0015843 A1* | 1/2009 | Demers ................ G01C 19/728 356/462 |

* cited by examiner

INTERFEROMETRIC MEASUREMENT SYSTEM WITH OPTICAL FIBRE AND INERTIAL GUIDANCE OR NAVIGATION SYSTEM INCLUDING SUCH AN INTERFEROMETRIC MEASUREMENT SYSTEM

BACKGROUND OF THE INVENTION

1. Field of the Invention

The field of the present disclosure is that of the fiber-optic ring interferometers. More precisely, the invention relates to an interferometric measurement system based on a plurality of fiber-optic ring interferometers. A particular application of such a system relates to a device using several fiber-optic gyroscopes (FOGs) for measuring rotations about several axes.

2. Description of the Related Art

As known, a FOG is based on a Sagnac ring interferometer in reciprocal conFIG.uration, the ring being formed by a fiber-optic coil. A fiber-optic gyroscope generally includes a broad-spectrum source, a first beam splitter (called source-detector separator), a single-mode spatial and polarisation filter at the common input-output of the interferometer, a second splitter (called coil splitter), a fiber-optic coil and a detector.

In the present document, it is meant by broad-spectrum source, a light source having a coherence length lower than one millimeter.

In a reciprocal conFIG.uration, after having passed through the polariser and the spatial filter, the incident light beam is split to produce two secondary beams. The two secondary beams, polarised linearly at the input, propagate in opposite directions along a closed optical path, recombine with each other and produce interferences that depend on the phase shift of the beams during their recombination. At rest, the optical paths are perfectly reciprocal relative to each other, and the phase shifts induced in the propagating direction and in the counter-propagating direction cancel each other.

It is known that a Sagnac ring interferometer is sensitive to the physical phenomena liable to produce non-reciprocal phase-shifts. Among the main physical phenomena, the rotation of a Sagnac ring interferometer, with respect to an axis perpendicular to the surface of the ring, induces a phase-shift proportional to the rotational speed $\Omega$. From this property, called the Sagnac effect, follows the main application of a Sagnac ring interferometer to a gyroscope for measuring a rotational speed. Due to their stability, reliability and compactness, the fiber-optic gyroscopes are more and more used for rotation measurements in the inertial guidance or navigation systems.

Other physical phenomena, such as the Faraday magneto-optic effect, are also liable to induce non-reciprocal phase-shifts.

However, some phenomena produce effects liable to disturb the accuracy, the sensitivity and the time stability of a fiber-optic gyroscope. Hence, polarisation effects in fibers may induce spurious phase-shifts at the origin of bias errors. The use of a broad-spectrum source, a high extinction-ratio common input-output polariser, and a polarisation-maintaining optical fiber in a fiber-optic coil is advocated so as to limit the bias errors of a FOG (H. C. Lefèvre, J. P. Bettini, S. Vatoux and M. Papuchon, "Progress in optical fiber gyroscopes using integrated optics", Agard/Nato Conference on Guided Optical Structures in the Military Environment, AGARD CPP-383, 9A/1-13, 1985).

On the other hand, an inertial guidance or navigation system generally includes a three-gyroscope system so as to measure the rotations about three axes of a coordinate system in space, the axes of the three fiber coils forming the axes of the coordinate system. Let's note that, in some cases, for redundancy need, more than three axes may be used.

Figure 1:
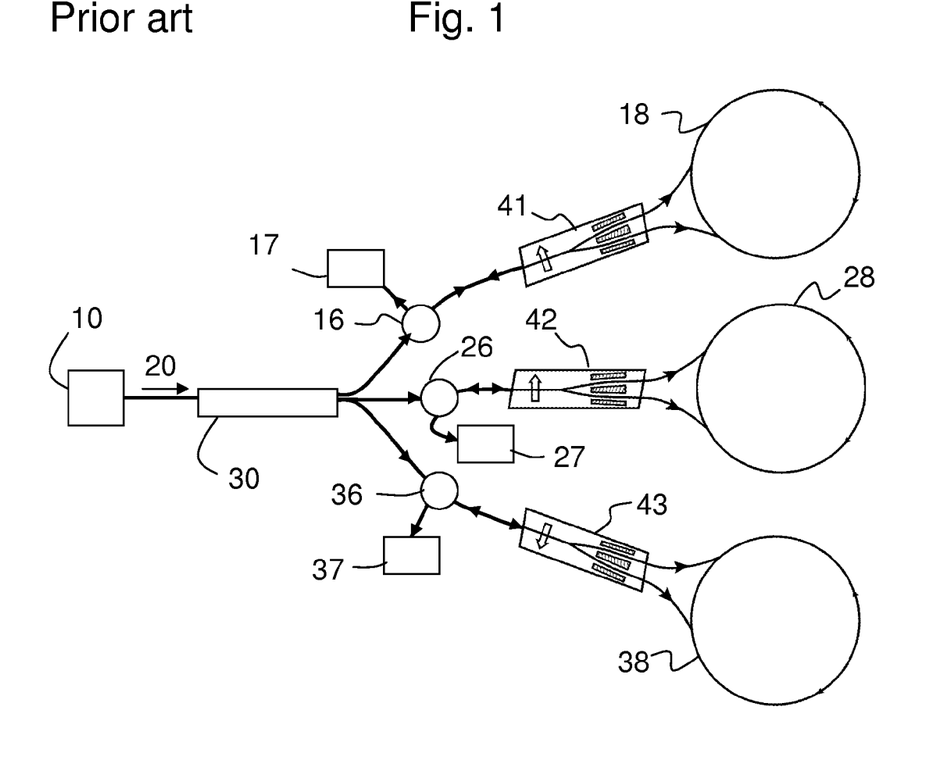
FIG. 1 shows a system of three fiber-optic gyroscopes according to the prior art.

In such systems, for reasons of compactness, cost and stability, the optical technologies in solid medium are preferred. Hence, the FOGs implement the technologies of stimulated-emission amplified spontaneous emission source or ASE (Amplified Spontaneous Emission) source with a rare-earth doped amplifying optical fiber, or of semi-conductor superluminescent diode, of optical fiber (for the coil) and of integrated optical circuit (IOC) with multiple functions (polariser, beam splitter, phase modulators). FIG. 1 shows a three-FOG system including a single light source 10 and three interferometers. The source 10 generates a light beam 20. A first beam splitter 30 splits the beam 20 into three split beams. The beam splitter 30 is for example a 1×3 fiber-optic coupler. Each interferometer includes a fiber-optic coil 18, respectively 28, 38, and an integrated optical circuit 41, respectively 42, 43. The integrated optical circuits 41, 42, 43 allow performing several functions integrated on a same substrate. These circuits allow to increase the compactness of the device and to reduce the manufacturing costs. Typically, each integrated optical circuit 41, 42, 43 includes a single-mode waveguide at the input, a coil splitter, for example a Y-junction, an input connection towards the source and towards a detector, and two connections towards the ends of the fiber coil. Advantageously, each integrated optical circuit serves as a polariser and includes means for modulating the signal. The light source 10 is connected by single-mode optical fibers to each integrated optical circuit. Each fiber coil 18, respectively 28, 38, is connected to an independent integrated optical circuit on different substrates (cf. FIG. 1).

For reasons of compactness and cost, it is desirable to replace the different independent integrated optical circuits of the device of FIG. 1 by a multiple integrated optical circuit formed by the integration of several individual IOCs on a single substrate. A multiple integrated optical circuit may hence be advantageously connected on the one hand to a single and same source and on the other hand to different fiber-optic Sagnac ring interferometers. Moreover, the use of fiber comb (multi-fiber array) is known to simplify the alignment between the ends of optical fibers and of waveguides of a multiple integrated optical circuit. A fiber comb is generally consisted of a planar substrate including "V" notches regularly spaced from each other so as to position accurately the ends of different optical fibers along a same line and to allow a collective coupling.

Figure 2:
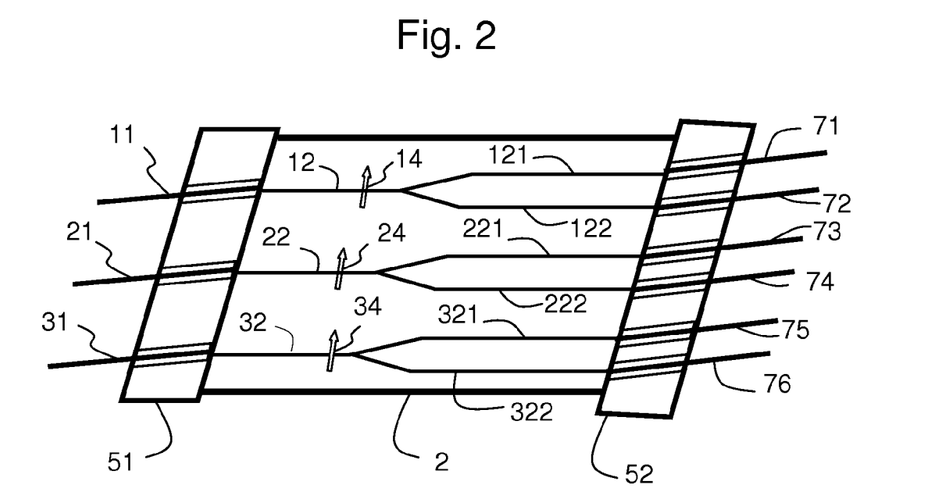
FIG. 2 shows a substrate integrating three individual integrated optical circuits in parallel.

FIG. 2 shows a top view of a multiple integrated optical circuit connected to optical fibers combs at the input and the output. By way of example, the multiple integrated optical circuit includes three individual integrated optical circuits arranged in parallel on the same substrate 2. In the example shown, each individual integrated optical circuit includes a coil splitter, of the Y-junction type, having a common trunk 12 (respectively 22, 32) and two branches 121 and 122 (respectively 221, 222 and 321, 322). A first fiber comb 51 allows to align and hold optical fibers 11, respectively 21, 31, opposite the ends of the common trunks 12, respectively 22, 32. A second fiber comb 52 allows to align and hold the optical fibers 71, 72, 73, 74, 75, 76 opposite the opposite ends of the different branches of the waveguides, respectively 121, 122, 221, 222, 321, 322. A beam propagating in the optical fiber 11 is coupled in the waveguide 12, then split by the Y-junction into two secondary beams propagating separately up to the ends 121 and 122 of the waveguide. The secondary beams are coupled to the ends of the optical fibers 71 and 72.

Moreover, an integrated optical circuit allows to integrate other functions on the same substrate: polarisation of the beams, modulations . . . . Advantageously, the common trunks 12, 22, 32 include polarising waveguides 14, 24, 34 integrated on a lithium niobate substrate 2. Electro-optic phase modulators may be arranged on either side of the branches 121, 122 (respectively 221, 222 and 321, 322) to modulate the phase of the interferometric signals.

However, in practice, the use of a multiple integrated optical circuit in a system of several fiber-optic gyroscopes states problems of spurious couplings between the different fibers connected and hence between the different interferometers. If these spurious couplings are coherent, this may induce unstable bias defects. Moreover, it is to be avoid that the different interferometers are in coherence with each other. Preferably, a single and same light source is used for the different interferometers. The source used is generally a broad-spectrum source, having a coherence length from a few tens of micrometers (for a superluminescent diode) to several hundreds of micrometers (for an ASE source). It is known that a broad-spectrum source may be considered as emitting wave trains that have for length the coherence length of the source. Now, in practice, the lengths of the different optical paths are not equal to each other to within such ten or hundred of micrometers. A length difference of several millimeters is sufficient a priori to cancel the phenomena of coherent coupling between the different interferometers.

The physical phenomena at the origin of the spurious couplings in a multiple IOC may be varied and are generally complex: coupling of a part of the incidence wave via the substrate between the optical fiber ends on the opposite faces of the substrate or at a Y-junction, multiple internal reflections in the substrate . . . .

Different solutions have been contemplated to reduce the spurious couplings in an integrated optical circuit. Hence, the patent document U.S. Pat. No. 5,321,779 proposes to form notches in the lower and upper faces of a IOC in order to attenuate the spurious internal reflections.

However, even using such notches, the performances of each FOG of a system including a multiple integrated optical circuit on a same substrate remain limited in terms of time stability. In practice, bias unstabilities of $10^{-5}$ to $10^{-6}$ radians in phase shift are observed.

SUMMARY OF THE INVENTION

The present invention has for object to remedy the drawbacks of the prior art interferometric systems and more particularly relates to a fiber-optic interferometric measurement system, including:
- a broad-spectrum light source adapted to emit a source light beam;
- a beam splitter adapted to receive the source light beam and to form a first split source beam and a second split source beam;
- first optical transmission means of optical length $\lambda_1$ adapted to transmit the first split source beam and second optical transmission means of optical length $\lambda_2$ adapted to transmit the second split source beam;
- a first Sagnac ring interferometer including a first fiber-optic coil and first individual integrated optical circuit connected on the one hand to the first optical transmission means and on the other hand to the two ends of the first fiber-optic coil, the first fiber-optic coil having a length $L_1$ and a group birefringence index difference $\Delta N_{b1}$;
- a first detector adapted to detect a first interferometric signal formed by the propagation of the first split source beam in the first Sagnac ring interferometer;
- a second Sagnac ring interferometer comprising a second fiber-optic coil and a second individual integrated optical circuit connected on the one hand to the second optical transmission means and on the other hand to the two ends of the second fiber-optic coil, the second fiber-optic coil having a length $L_2$ and a group birefringence index difference $\Delta N_{b2}$; and
- a second detector adapted to detect a second interferometric signal formed by the propagation of the second split source beam in the second Sagnac ring interferometer.

According to the invention, the interferometric measurement system includes a multiple integrated optical circuit integrating on a same substrate the first individual integrated optical circuit and the second individual integrated optical circuit, and
the difference $\Delta\lambda$ between the optical length $\lambda_1$ of the first optical transmission means and the optical length $\lambda_2$ of the second optical transmission means is higher than the maximum of $\Delta N_{b1} \times L_1$ and $\Delta N_{b2} \times L_2$.

According to various advantageous aspects of the invention:
- the difference $\Delta\lambda$ between the optical length $\lambda_1$ of the first optical transmission means and the optical length $\lambda_2$ of the second optical transmission means is higher than four times the value of the maximum of $\Delta N_{b1} \times L_1$ and $\Delta N_{b2} \times L_2$;
- the first optical transmission means include an optical fiber and/or the second optical transmission means include an optical fiber.

In a preferred embodiment, the first, respectively the second, fiber-optic coil, includes a polarisation-maintaining optical fiber having a group birefringence index difference $\Delta N_{b1}$, respectively $\Delta N_{b2}$, comprised between $10^{-4}$ and $10^{-3}$ and the difference $\Delta\lambda$ between the optical length $\lambda_1$ of the first fiber-optic transmission means and the optical length $\lambda_2$ of the second fiber-optic transmission means is comprised between $10^{-4}$ and $10^{-3}$ multiplied by the maximum of $L_1$ and $L_2$.

According to a particular embodiment, the fiber-optic interferometric measurement system further includes a first, respectively a second, source-detector separator arranged between the beam splitter and the multiple integrated circuit, and the difference $\Delta\lambda$ between the optical length $\lambda_1$ of the first optical transmission means and the optical length $\lambda_2$ of the second optical transmission means is located between the beam splitter and the first and second source-detector separators.

According to another particular embodiment, the fiber-optic interferometric measurement system further includes a first, respectively a second, source-detector separator arranged between the beam splitter and the multiple integrated circuit, and the difference $\Delta\lambda$ between the optical length $\lambda_1$ of the first optical transmission means and the optical length $\lambda_2$ of the second optical transmission means is located between the multiple integrated circuit and the first and second source-detector separators.

According to a particularly advantageous embodiment, the fiber-optic interferometric measurement system further includes third optical transmission means of optical length $\lambda_3$ adapted to transmit a third split source beam, a third Sagnac ring interferometer including a third fiber-optic coil and a third individual integrated optical circuit connected on the one hand to the third optical transmission means and on the other hand to the two ends of the third fiber-optic coil, the third fiber-optic coil having a length $L_3$ and a group birefringence index difference $\Delta N_{b3}$, the multiple integrated optical circuit integrates on the same substrate the first individual integrated optical circuit, the second individual integrated optical circuit and the third individual integrated optical circuit, and the optical length difference between any two of the first, second and third optical transmission means is higher than the maximum of $\Delta N_{b1} \times L_1$, $\Delta N_{b2} \times L_2$ and $\Delta N_{b3} \times L_3$.

Preferentially, the optical length difference between any two of the first, second and third optical transmission means is higher than four times the value of the maximum of $\Delta N_{b1} \times L_1$, $\Delta N_{b2} \times L_2$ and $\Delta N_{b3} \times L_3$.

Advantageously, the broad-spectrum light source is chosen among a superluminescent diode and a rare-earth doped fiber ASE source.

The invention especially relates to a gyroscopic measurement system including a fiber-optic interferometric measurement system according to one of the embodiments described, wherein a first fiber-optic gyroscope includes the first fiber-optic interferometer, a source-detector separator and a detector.

The invention also relates to an inertial guidance or navigation system comprising a fiber-optic interferometric measurement system according to one of the embodiments described.

The invention will find a particularly advantageous application in interferometric measurement systems integrating several fiber-optic gyroscopes, in particular inertial guiding and navigation systems.

The present invention also relates to the characteristics that will be revealed during the following description and that will have to be considered in isolation or according to any technically possible combination thereof.

BRIEF DESCRIPTION OF THE DRAWING FIGURES

This description, which is given only by way of non-limitative example, will permit to better understand how the invention can be implemented, in reference to the appended drawings, in which.

DETAILED DESCRIPTION OF THE INVENTION

Figure 3:
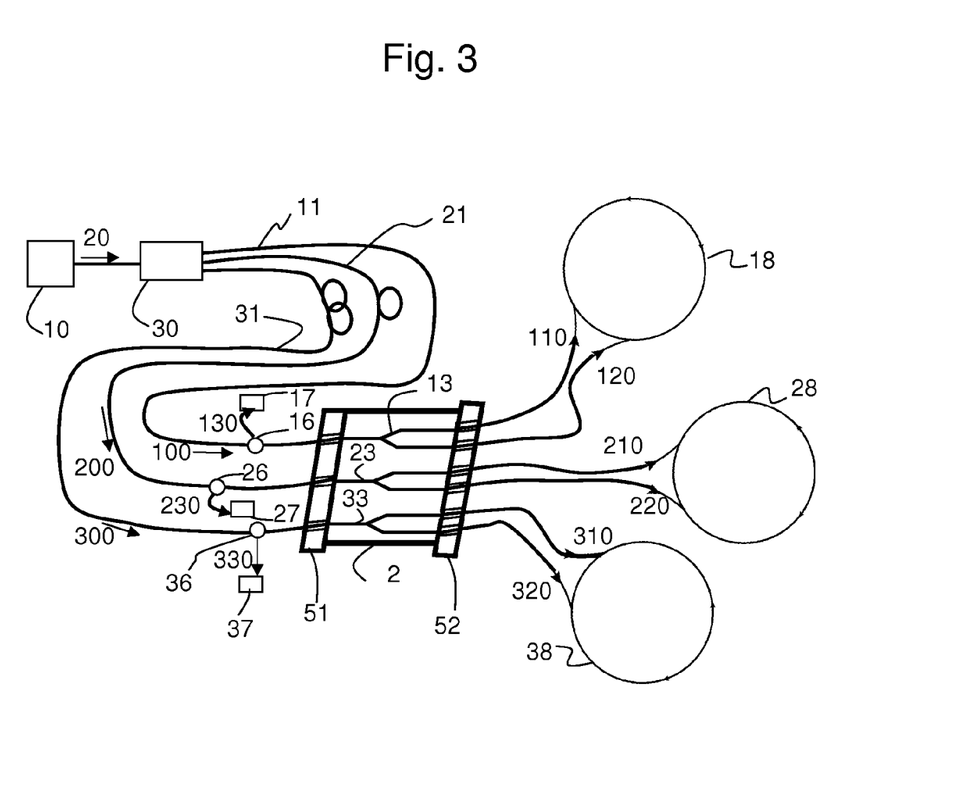
FIG. 3 shows a system of fiber-optic gyroscopes according to a preferred embodiment of the invention.

The gyroscopic measurement system includes a broad-spectrum light source 10, preferably an "ASE" source (rare earth, in particular erbium or neodymium, doped source) or a superluminescent diode (SLD). The broad-spectrum light source 10 emits a source light beam 20 located at a wavelength $\lambda$. In the case where the source is an erbium-doped ASE source, the emission wavelength is about 1530 nm (cf. example of FIG. 4). A beam splitter 30 splits the source light beam into three split source beams. Advantageously, the first, second and third split source beams 100, 200, 300 have identical powers. The beam splitter 30 is for example consisted of a fiber-optic component, such as a 1×3 fiber-optic coupler. Optical fibers 11, 21, 31 transmit the first, second and third split source beams 100, 200, 300, respectively, to a fiber comb 51. The ends of the fibers 11, 21, 31 are respectively aligned opposite the ends of the different individual integrated optical circuits arranged in parallel on a same substrate 2.

A first individual integrated optical circuit 13 is connected on the one hand to an end of the first optical fiber 11 and on the other hand to the two ends of a first fiber-optic coil 18 through a second fiber comb 52. The first individual integrated optical circuit 13 includes a beam splitter so as to split the first split source light beam 100 into a first secondary beam 110 circulating through the first fiber-optic coil 18 in the propagating direction and a second secondary beam 120 circulating through the first fiber-optic coil 18 in the counter-propagating direction. The two secondary beams 110, 120 recombine with each other at the beam splitter of the first individual IOC 13 and form an interferometric beam 130. A source-detector separator 16 directs the interferometric beam 130 towards a first detector 17. The source-detector separator 16 may be manufactured from a −3 dB coupler or from an optical circulator. The first individual integrated optical circuit 13 and the first fiber-optic coil 18 form a first Sagnac ring interferometer 19.

On the same substrate 2 are arranged a second individual integrated optical circuit 23 and a third individual integrated optical circuit 33. Similarly, the second individual integrated optical circuit 23 is connected on the one hand to a second optical fiber 21 transmitting the split source beam 200 and on the other hand to the two ends of a second fiber-optic coil 28. Respectively, the third individual integrated optical circuit 33 is connected on the one hand to a third optical fiber 31 transmitting the split source beam 300 and on the other hand to the two ends of a third fiber-optic coil 38. The second individual integrated optical circuit 23 includes a beam splitter so as to split the second split source light beam 200 into a first secondary beam 210 circulating through the second fiber-optic coil 28 in the propagating direction and a second secondary beam 220 circulating through the second fiber-optic coil 28 in the counter-propagating direction. The two secondary beams 210, 220 recombine with each other at the beam splitter of the second individual IOC 23 and form an interferometric beam 230. The third individual integrated optical circuit 33 includes a beam splitter so as to split the third split source light beam 300 into a first secondary beam 310 circulating through the third fiber-optic coil 38 in the propagating direction and a second secondary beam 320 circulating through the third fiber-optic coil 38 in the counter-propagating direction. The two secondary beams 310, 320 recombine with each other at the beam splitter of the third individual IOC 33 and form an interferometric beam 330. A source-detector separator 26, respectively 36, directs the interferometric beam 230, respectively 330, towards a detector 27, respectively 37. The second individual integrated optical circuit 23 and the second fiber-optic coil 28 form a second Sagnac ring interferometer 29. Likewise, the third individual integrated optical circuit 33 and the third fiber-optic coil 38 form a third Sagnac ring interferometer 39.

Advantageously, each individual integrated optical circuit 13, respectively 23, 33, includes an integrated polariser 14, 24, 34, so as to polarise linearly the split source beams propagating in the fiber-optic coils (see FIG. 2). Preferentially, the fiber-optic coil 18, 28, 38 is formed from a polarisation-maintaining optical fiber whose axes are aligned along the polarisation axis of the polariser of each individual IOC 13, respectively 23, 33. Different polarisation-maintaining optical fibers based on the use of stress bars or of an elliptic core are known. The polarisation-maintaining optical fibers are birefringent fibers.

As mentioned above, it is desired to reduce the coherent spurious couplings between the different FOGs connected to a multiple integrated circuit integrated on a single and same substrate 2.

Figure 4:
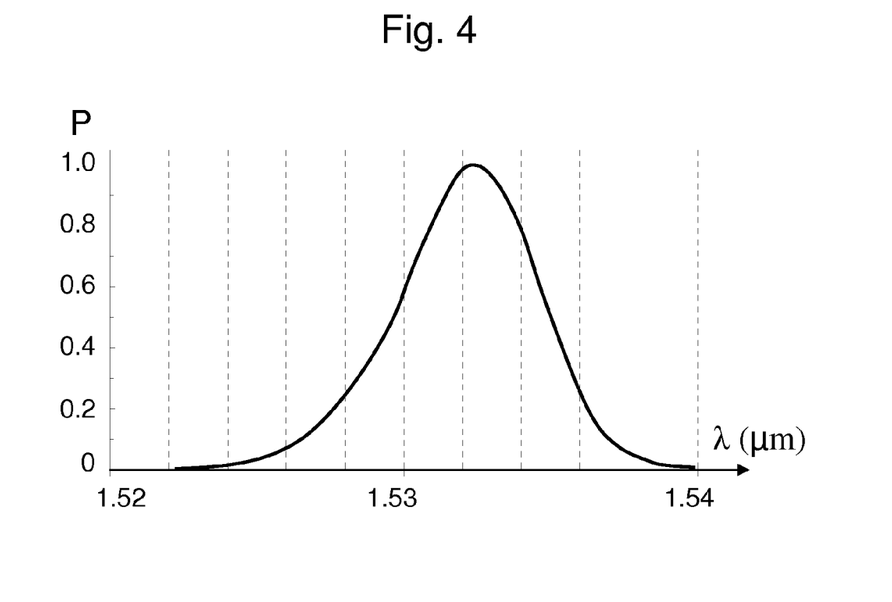
FIG. 4 shows the normalised power spectrum of a broad-spectrum source.

For that purpose, let's consider a broad-spectrum light source 10 of the "ASE" type (source doped with rare earth, in particular erbium, or superluminescent diode SLD) used in the device of FIG. 3. FIG. 4 shows the normalised light power spectrum P as a function of the wavelength $\lambda$ measured at the output of the broad-spectrum light source 10. This spectrum $P(\lambda)$ appears smooth as a function of the wavelength.

Figure 5:
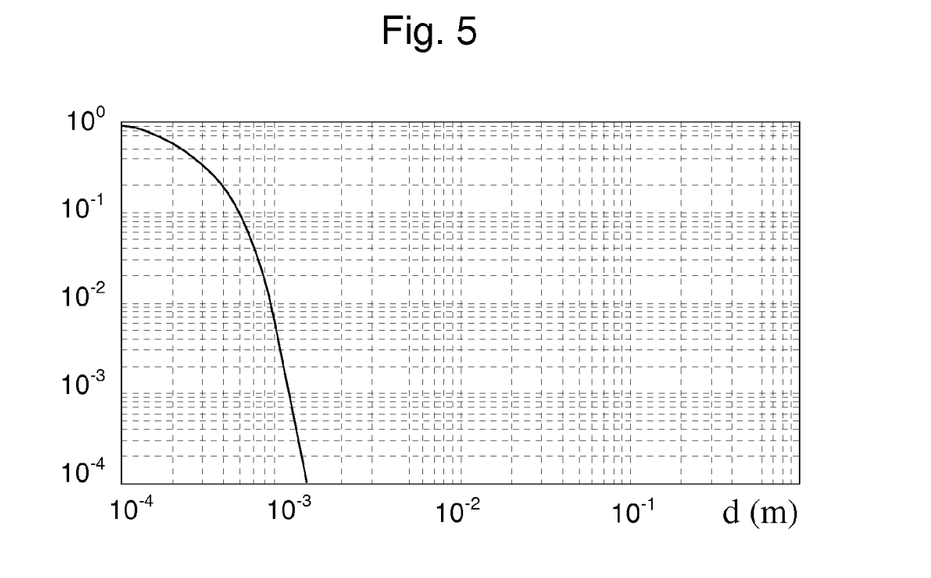
FIG. 5 shows, in logarithmic scale, the coherence function of the spectrum of FIG. 4.

FIG. 5 shows the coherence function C(d) of the source 10 (i.e. the Fourier transform of the spectrum of FIG. 4) on a logarithmic scale in abscissae and ordinates. In FIG. 5, the coherence function C(d) of the broad-spectrum light source 10 exhibits a continuous decrease and becomes negligible beyond a distance d of one millimeter.

As explained above, the source used is generally a broad-spectrum source, having a coherence length of a few hundreds of micrometers. The length differences between the optical paths going from the source to the input of the different interferometers are in practice not equal to each other to within a few millimeters. A length difference of a few millimeters is sufficient a priori to eliminate the coherence of the spurious couplings between the different interferometers.

Figure 6:
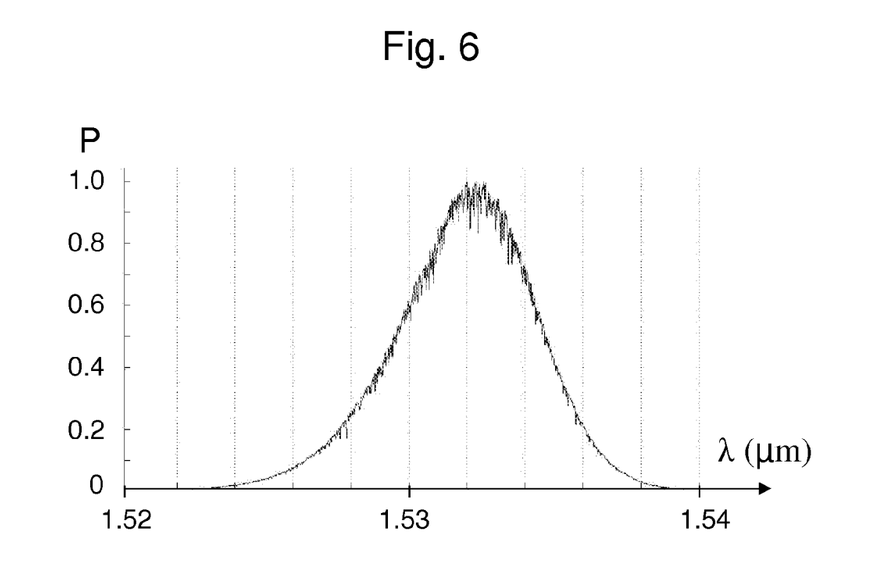
FIG. 6 shows the spectrum of the source of FIG. 4 after the passage in the interferometer.

A consideration belonging to the present invention consists in measuring the spectrum (and the associated coherence function) of the source at the output of the fiber-optic interferometer and not at the input. FIG. 6 shows the normalised light power spectrum P as a function of the wavelength $\lambda$ measured at the output of a fiber-optic interferometer, the light arriving just before the detector 17. In the example shown, the interferometer includes a fiber-optic coil 18 having a length L of 200 m, the optical fiber being birefringent and having a group birefringence index difference $\Delta N_b \approx 3.10^{-4}$. The spectrum of FIG. 6 is centred on the same wavelength (~1,53 µm) as the spectrum of FIG. 4 and has substantially the same spectral width. However, the spectrum of FIG. 6 has random grooves as a function of the wavelength.

Figure 7:
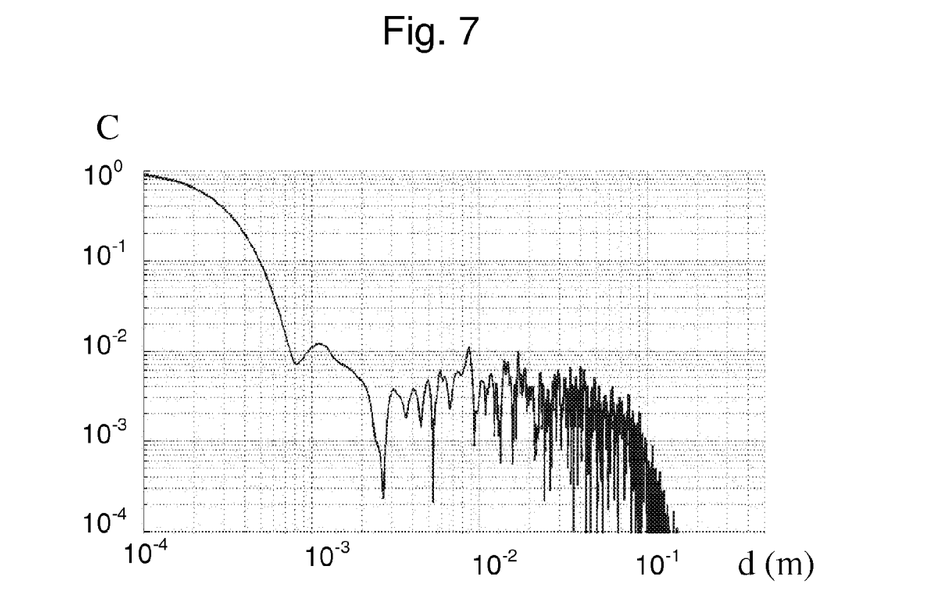
FIG. 7 shows, in logarithmic scale, the coherence function of the spectrum of FIG. 6.

Similarly to FIG. 5, FIG. 7 shows the coherence function C(d) measured at the output of the interferometer (i.e. the Fourier transform of the spectrum of FIG. 6). This coherence function C(d) exhibits a decrease down to about $10^{-2}$ and has typically random fluctuations between $10^{-2}$ and $10^{-3}$ that continue beyond a distance d of several centimeters or even several tens of centimeters.

The analysis of the invention made based on FIGS. 6 and 7 is the following. A single polarisation of the source is filtered at the input of the interferometer and passes through a polarisation-maintaining fiber coil, for example the coil 18. However, the maintaining is not perfect in the birefringent optical fiber. In practice, the propagation is carried out according to the fast mode (same mode as that transmitted by the IOC, in the case of a lithium-niobate proton-exchange IOC). There is hence coupled light in the slow mode, but the latter is not a trouble because it will be eliminated at the output by the polariser. On the other hand, a part of this coupled light in the slow mode may be recoupled in the fast mode. This double coupling produces delayed light that has propagated in the fast mode, then in the slow mode, to come again in the fast mode. The starting compact wave train, that had for length the coherence length of the source, exits with a coherent trail, which corresponds to these delayed double couplings, even if the polariser 14 is perfect.

The considered fiber-optic coils 18, 28, 38 are polarisation-maintaining optical fibers operating in a so-called intrinsic regime. It is reminded that the propagation group time difference between the two main polarisation modes, denoted DGD-I (differential group delay) increases linearly as a function of the length $L_1$ of the fiber-optic coil in the intrinsic regime:

$$DGD\text{-}I = PMD\text{-}I \times L_1$$

where the coefficient PMD-I is linked to the group birefringence index difference $\Delta N_b$ between the orthogonal modes and to the speed of light in vacuum c:

$$PMD\text{-}I = \Delta N_b / c$$

More precisely, the coefficient PMD-I represents the polarisation modes dispersion coefficient in a so-called intrinsic regime. The coefficient PMD-I is generally expressed in ps/km. As explained in detail in the patent document FR2966926A1, there also exists a coefficient PMD-C in coupled regime, which increases as a function of the square root of the coil length. In this case of coupled regime, the differential group delay is:

$$DGD\text{-}C = PMD\text{-}C \times \sqrt{L_1}$$

Herein, it is essentially considered the intrinsic mode that gives, in practice, a DGD-I higher than the DGD-C.

For a fiber-optic coil 18 of length $L_1$ equal to 1 km and having a group birefringence index difference $\Delta N_{b1}$ of $3.10^{-4}$ to $5.10^{-4}$, a coefficient PMD-I comprised between 1 and 1.6 ns/km and a cumulated value of DGD-I comprised between 1 and 1.6 ns are found. This cumulated value of DGD-I corresponds to an optical length equal to $\Delta N_{b1} \times L_1$ or, equivalently, a length equal to $c \times PMD\text{-}I \times L_1$, i.e. about 50 cm in vacuum for a fiber-optic coil having a length $L_1$ of 1 km.

This explains the occurrence of random notches observed on the spectrum of FIG. 6. Indeed, the coherence function calculated by Fourier transform exhibits random fluctuations, typically about $10^{-2}$ to $10^{-3}$, and over a distance corresponding to the length equivalent to the total DGD-I (Differential Group Delay) of the coil: typically a distance equivalent to 1/2000 of its length $L_1$.

It is desired to minimise the coherence of the spurious recouplings between the different Sagnac interferometers, taken two by two. The reasoning is applied by analogy to any number of interferometers. For example, it is desired to minimise the coherent spurious recouplings between a first fiber-optic interferometer and a second fiber-optic interferometer. The first fiber-optic coil 18 has a length $L_1$ and exhibits a group birefringence index difference $\Delta N_{b1}$ that corresponds to a polarisation modes dispersion coefficient equal to PMD-$I_1$. Respectively, the second fiber-optic coil 28 has a length $L_2$ and exhibits a group birefringence index difference $\Delta N_{b2}$ that corresponds to a polarisation modes dispersion coefficient equal to PMD-$I_2$. Preferentially, the fiber-optic coils 18 and 28 include polarisation-maintaining single-mode fibers. The polarisation modes dispersion in the first fiber-optic coil 18 induces a coherent trail over a length equal to $\Delta N_{b1} \times L_1 = c \times PMD\text{-}I_1 \times L_1$. Likewise, the polarisation modes dispersion of the in the second fiber-optic coil 28 induces a coherent trail over a length equal to $\Delta N_{b2} \times L_2 = c \times PMD\text{-}I_2 \times L_2$.

In a device with several fiber-optic gyroscopes based on the use of a single and same source and a multiple IOC, coherent spurious couplings can occur between the signals coming from the first fiber-optic interferometer and from the second fiber-optic interferometer as soon as the distance between these signal is lower than the maximum of $c \times PMD\text{-}I_1 \times L_1$ and $c \times PMD\text{-}I_2 \times L_2$.

The solution proposed consists in introducing an optical length difference $\Delta\lambda$ at the source beam between the respective inputs of the different interferometers. It is reminded that the optical length $\lambda$ is equal to the product of the physical length by the refractive index of the material (about 1.45 for an optical fiber).

Let's note $\lambda_1$ the optical length of the first fiber-optic transmission means 11 taken between the source 10 and the input of the first individual integrated optical circuit 13 on the substrate 2, and respectively $\lambda_2$ the optical length of the second fiber-optic transmission means 21 taken between the source 10 and the input of the second individual integrated optical circuit 23 on the substrate 2. To attenuate the coherence of the physical phenomena of spurious recoupling between the first and the second interferometers, the difference $\Delta\lambda$ between the optical length $\lambda_1$ and the optical length $\lambda_2$ of the second fiber-optic transmission means is chosen so as to be higher than the maximum of $\Delta N_{b1} \times L_1 = c \times PMD\text{-}I_1 \times L_1$ and $\Delta N_{b2} \times L_2 = c \times PMD\text{-}I_2 \times L_2$.

Preferably, the difference $\Delta\lambda$ between the optical length $\lambda_1$ of the first fiber-optic transmission means and the optical length $\lambda_2$ of the second fiber-optic transmission means is higher than four times the maximum of $\Delta N_{b1} \times L_1$ and $\Delta N_{b2} \times L_2$.

This arrangement is very easily implemented in a system having several Sagnac ring fiber-optic interferometers, including a single source and a multiple integrated circuit comprising several individual integrated optical circuits in parallel on a single and same substrate. Let's suppose that the fiber-optic coils of the different interferometers are manufactured from a same type of fiber, having a group birefringence index difference $\Delta N_b$ and have substantially the same length L, which is the case for obtaining a sensitivity of the same order on different axes of a system of gyroscopes. In this case, it is sufficient to determine the minimum optical length difference to be respected between all the optical paths extending between the source beam splitter 30 and the input of the multiple integrated optical circuit. When the optical length difference between the source and any one of the interferometers, taken two by two, is higher than the value of $\Delta N_b \times L$, the spurious recouplings cannot disturb the interferometric signals on one of the interferometers.

In a numerical example of application, the first fiber-optic coil 18 and the second fiber-optic coil 28 have the same length $L_1 = L_2 = 1$ km, the same refractive index n of about 1.45 and the same group birefringence index difference $\Delta N_{b1} = \Delta N_{b2}$, hence the same polarisation modes dispersion coefficient PMD-$I_1$=PMD-$I_2$=1,5 ns/km. The optical length $\lambda_1$ of the optical fiber 11 is equal to the product of the physical length of the optical fiber 11 by its refractive index n. The difference $\Delta\lambda$ between the optical lengths $\lambda_1$ and $\lambda_2$ has hence to be higher than 50 cm in vacuum, which corresponds to an optical fiber physical length difference of 35 cm. Advantageously, a physical length difference $\Delta\lambda$/n of 1 to 2 m is chosen.

This difference $\Delta\lambda$ between the optical lengths $\lambda_1$ and $\lambda_2$ of several tens of cm (or even more than one meter) is far higher than what is implemented in the interferometric systems of the prior art. In the prior devices, are generally used lengths for the different optical paths between the source and each interferometer that are different from each other by several millimeters, i.e. an optical length difference $\Delta\lambda$ slightly higher than the coherence length of the source, generally of the order of a few hundreds of micrometers.

On the contrary, according to the invention, the criterion of length difference linked to the coherence length of the source is not sufficient, a length difference of more than 1000 times the coherence length of the source is required.

The one skilled in the art will easily generalize the principle of the invention to a system of three fiber-optic Sagnac ring interferometers, having respectively a length $L_i$ with i=1, 2, 3 and a group index difference $\Delta N_{bi}$ with i=1, 2, 3 or, equivalently, a polarisation modes dispersion coefficient PMD-$I_i$ with i=1, 2, 3. The highest value of the $\Delta N_{bi} \times L_i$ for i=1, 2, 3 is considered. Equivalently, the highest value of $c \times PMD\text{-}I_i \times L_i$ for i=1, 2, 3 is considered. The optical length difference $\Delta\lambda$ between the broad-spectrum light source 10 and any two of the interferometers is determined is such a manner to be higher than or equal to the maximum of $\Delta N_{bi} \times L_i$ for i=1, 2, 3 (or to the maximum of $c \times PMD\text{-}I_i \times L_i$ for i=1, 2, 3).

Preferably, the optical length difference $\Delta\lambda$ between the broad-spectrum light source 10 and any two of the interferometers is higher than four times the maximum of $\Delta N_{b1} \times L_1$, $\Delta N_{b2} \times L_2$ and $\Delta N_{b3} \times L_3$.

The physical lengths of the optical fibers 11, 21 and 31 allow to materialize the optical lengths of the different optical paths between the common source 10 and the input of the multiple IOC. The optical length difference is located between the source beam splitter 30 and the respective inputs of each FOGs on the multiple IOC. This length difference between the optical fibers 11, 21 and 31 may be located between the source beam splitter 30 and a source-detector separator 16, 26, respectively 36 and/or between the multiple IOC and a source-detector separator 16, 26, respectively 36. In FIG. 3, the difference $\Delta\lambda$ between the lengths of the different optical fibers is schematically represented by one or several fiber-optic loops.

The invention allows to manufacture a Sagnac ring fiber-optic interferometric system using a single source and a multiple IOC, while reducing considerably the coherent spurious couplings occurring between the signals of different fiber-optic interferometers.

The system of the invention hence allows to increase the compactness of a system with several interferometers via the use of a multiple IOC integrating several individual IOCs in parallel on a single substrate, while maintaining the long-term bias qualities of each of the independent interferometers.

The invention finds an application in particular in the inertial guidance or navigation systems using several fiber-optic gyroscopes.

The invention claimed is:

1. A fiber-optic interferometric measurement system including:
   a broad-spectrum light source adapted to emit a source light beam;

a beam splitter adapted to receive the source light beam and to form a first split source beam and a second split source beam;

first optical transmission means of optical length $l_1$ adapted to transmit the first split source beam and second optical transmission means of optical length $l_2$ adapted to transmit the second split source beam;

a first Sagnac ring interferometer including a first fiber-optic coil and a first individual integrated optical circuit connected on the one hand to the first optical transmission means and on the other hand to the two ends of the first fiber-optic coil, the first fiber-optic coil having a length $L_1$ and a group birefringence index difference $\Delta N_{b1}$;

a first detector adapted to detect a first interferometric signal formed by the propagation of the first split source beam in the first Sagnac ring interferometer;

a second Sagnac ring interferometer comprising a second fiber-optic coil and a second individual integrated optical circuit connected to the second optical transmission means and to the two ends of the second fiber-optic coil, the second fiber-optic coil having a length $L_2$ and a group birefringence index difference $\Delta N_{b2}$;

a second detector adapted to detect a second interferometric signal formed by the propagation of the second split source beam in the second Sagnac ring interferometer; and a multiple integrated optical circuit integrating on a same substrate the first individual integrated optical circuit and the second individual integrated optical circuit, wherein the difference $\Delta l$ between the optical length $l_1$ of the first optical transmission means and the optical length $l_2$ of the second optical transmission means is higher than the maximum of $\Delta N_{b1} \times L_1$ and $\Delta N_{b2} \times L_2$.

2. The fiber-optic interferometric measurement system according to claim 1, wherein the difference $\Delta l$ between the optical length $l_1$ of the first optical transmission means and the optical length $l_2$ of the second optical transmission means is higher than four times the value of the maximum of $\Delta N_{b1} \times L_1$ and $\Delta N_{b2} \times L_2$.

3. The fiber-optic interferometric measurement system according to claim 1, wherein the first optical transmission means include an optical fiber and/or the second optical transmission means include an optical fiber.

4. The fiber-optic interferometric measurement system according to claim 1, wherein the first and the second, fiber-optic coil include a polarisation-maintaining optical fiber having a group birefringence index difference $\Delta N_{b1}$, respectively $\Delta N_{b2}$, comprised between $10^{-4}$ and $10^{-3}$, and wherein the difference $\Delta l$ between the optical length $l_1$ of the first fiber-optic transmission means and the optical length $l_2$ of the second fiber-optic transmission means is comprised between $10^{-4}$ and $10^{-3}$ multiplied by the maximum of $L_1$ and $L_2$.

5. The fiber-optic interferometric measurement system according to claim 1, further including a first source-detector separator and a second source-detector separator arranged between the beam splitter and the multiple integrated circuit, wherein the difference $\Delta l$ between the optical length $l_1$ of the first optical transmission means and the optical length $l_2$ of the second optical transmission means is located between the beam splitter and the first and second source-detector separators.

6. The fiber-optic interferometric measurement system according to claim 1, further including a first source-detector separator and a second source-detector separator arranged between the beam splitter and the multiple integrated circuit, wherein the difference $\Delta l$ between the optical length $l_2$ of the first optical transmission means and the optical length $l_2$ of the second optical transmission means is located between the multiple integrated circuit and the first and second source-detector separators.

7. The fiber-optic interferometric measurement system according to claim 1, further including third optical transmission means of optical length $l_3$ adapted to transmit a third split source beam, a third Sagnac ring interferometer including a third fiber-optic coil and a third individual integrated optical circuit connected to the third optical transmission means and to the two ends of the third fiber-optic coil, the third fiber-optic coil having a length $L_3$ and a group birefringence index difference $\Delta N_{b3}$, wherein the multiple integrated optical circuit integrates on the same substrate the first individual integrated optical circuit, the second individual integrated optical circuit and the third individual integrated optical circuit and wherein the difference of optical length between any two of the first, second and third optical transmission means is higher than the maximum of $\Delta N_{b1} \times L_1$, $\Delta N_{b2} \times L_2$ and $\Delta N_{b3} \times L_3$.

8. The fiber-optic interferometric measurement system according to claim 7, wherein the optical length difference between any two of the first, second and third optical transmission means is higher than four times the value of the maximum of $\Delta N_{b1} \times L_1$, $\Delta N_{b2} \times L_2$ and $\Delta N_{b3} \times L_3$.

9. The fiber-optic interferometric measurement system according to claim 1, wherein the broad-spectrum light source is chosen among a superluminescent diode and a rare-earth doped fiber source.

10. A gyroscopic measurement system including the fiber-optic interferometric measurement system according to claim 1, wherein the fiber-optic interferometric measurement system is configured to measure a rotation speed with respect to an axis perpendicular to a surface of the first fiber-optic coil and to measure another rotation speed with respect to another axis perpendicular to a surface of the second fiber-optic coil.

11. An inertial guidance or navigation system comprising the fiber-optic interferometric measurement system according to claim 1, wherein said inertial guidance or navigation system includes three fiber-optic Sagnac ring interferometers, having respectively a length Li with i=1, 2, 3 and a group index difference $\Delta N_{bi}$ with i=1, 2, 3, wherein the three fiber-optic coils are configured to measure the rotations about three axes of a coordinate system in space, the axes of the three fiber-optic coils forming the axes of the coordinate system, and wherein the optical length difference between the broad-spectrum light source and any two of the three interferometers is higher than or equal to the maximum of $\Delta N_{bi} \times Li$ for i=1, 2, 3.

12. The fiber-optic interferometric measurement system according to claim 2, wherein the first optical transmission means include an optical fiber and/or the second optical transmission means include an optical fiber.

13. The fiber-optic interferometric measurement system according to claim 2, wherein the first fiber-optic coil and the second fiber-optic coil include a polarisation-maintaining optical fiber having a group birefringence index difference $\Delta N_{b1}$, respectively $\Delta N_{b2}$, comprised between $10^{-4}$ and $10^{-3}$, and wherein the difference $\Delta l$ between the optical length $l_1$ of the first fiber-optic transmission means and the optical length $l_2$ of the second fiber-optic transmission means is comprised between $10^{-4}$ and $10^{-3}$ multiplied by the maximum of $L_1$ and $L_2$.

14. The fiber-optic interferometric measurement system according to claim 3, wherein the first fiber-optic coil and the second, fiber-optic coil include a polarisation-maintaining optical fiber having a group birefringence index difference $\Delta N_{b1}$, respectively $\Delta N_{b2}$, comprised between $10^{-4}$ and $10^{-3}$, and wherein the difference $\Delta l$ between the optical length $l_1$ of the first fiber-optic transmission means and the optical length $l_2$ of the second fiber-optic transmission means is comprised between $10^{-4}$ and $10^{-3}$ multiplied by the maximum of $L_1$ and $L_2$.

15. The fiber-optic interferometric measurement system according to claim 2, further including a first source-detector separator and a second, source-detector separator arranged between the beam splitter and the multiple integrated circuit, wherein the difference $\Delta l$ between the optical length $l_2$ of the first optical transmission means and the optical length $l_2$ of the second optical transmission means is located between the beam splitter and the first and second source-detector separators.

16. The fiber-optic interferometric measurement system according to claim 3, further including a first source-detector separator and a second source-detector separator arranged between the beam splitter and the multiple integrated circuit, wherein the difference $\Delta l$ between the optical length $l_2$ of the first optical transmission means and the optical length $l_2$ of the second optical transmission means is located between the beam splitter and the first and second source-detector separators.

17. The fiber-optic interferometric measurement system according to claim 4, further including a first source-detector separator and a second source-detector separator arranged between the beam splitter and the multiple integrated circuit, wherein the difference $\Delta l$ between the optical length $l_1$ of the first optical transmission means and the optical length $l_2$ of the second optical transmission means is located between the beam splitter and the first and second source-detector separators.

18. The fiber-optic interferometric measurement system according to claim 2, further including a first source-detector separator and a second source-detector separator arranged between the beam splitter and the multiple integrated circuit, wherein the difference $\Delta l$ between the optical length $l_1$ of the first optical transmission means and the optical length $l_2$ of the second optical transmission means is located between the multiple integrated circuit and the first and second source-detector separators.

19. The fiber-optic interferometric measurement system according to claim 3, further including a first source-detector separator and a second source-detector separator arranged between the beam splitter and the multiple integrated circuit, wherein the difference $\Delta l$ between the optical length $l_1$ of the first optical transmission means and the optical length $l_2$ of the second optical transmission means is located between the multiple integrated circuit and the first and second source-detector separators.

20. The fiber-optic interferometric measurement system according to claim 4, further including a first source-detector separator and a second source-detector separator arranged between the beam splitter and the multiple integrated circuit, wherein the difference $\Delta l$ between the optical length $l_1$ of the first optical transmission means and the optical length $l_2$ of the second optical transmission means is located between the multiple integrated circuit and the first and second source-detector separators.

* * * * *